(12) United States Patent
Zhou et al.

(10) Patent No.: US 12,468,390 B2
(45) Date of Patent: Nov. 11, 2025

(54) SYSTEM AND METHOD FOR A BRAIN-COMPUTER INTERFACE

(71) Applicant: Science Corporation, Alameda, CA (US)

(72) Inventors: Emma Zhou, Alameda, CA (US); Sophia Sanborn, Alameda, CA (US); Max Hodak, Alameda, CA (US)

(73) Assignee: Science Corporation, Alameda, CA (US)

( * ) Notice: Subject to any disclaimer, the term of this patent is extended or adjusted under 35 U.S.C. 154(b) by 0 days.

(21) Appl. No.: 19/096,450

(22) Filed: Mar. 31, 2025

(65) Prior Publication Data

US 2025/0306680 A1   Oct. 2, 2025

Related U.S. Application Data

(60) Provisional application No. 63/571,815, filed on Mar. 29, 2024.

(51) Int. Cl.
*G06F 3/01* (2006.01)
*G06F 3/14* (2006.01)

(52) U.S. Cl.
CPC ............... *G06F 3/015* (2013.01); *G06F 3/14* (2013.01)

(58) Field of Classification Search
CPC .................................. G06F 3/14; G06F 3/015
USPC .......................................................... 345/156
See application file for complete search history.

(56) References Cited

U.S. PATENT DOCUMENTS

| | | | |
|---|---|---|---|
| 10,949,086 B2 | 3/2021 | Even-Chen et al. | |
| 2020/0023189 A1 | 1/2020 | Gribetz et al. | |
| 2022/0040126 A1* | 2/2022 | Kishnani | A61K 31/575 |
| 2022/0083807 A1 | 3/2022 | Zhang et al. | |
| 2024/0046071 A1 | 2/2024 | Aflalo et al. | |
| 2024/0053825 A1* | 2/2024 | Baber | G06F 3/0482 |

OTHER PUBLICATIONS

Goldt, et al., "Modeling the Influence of Data Structure on Learning in Neural Networks: The Hidden Manifold Model", Physical ReviewX 10, 041044 (2020) DOI: 10.1103/PhysRevX.10.041044.
Kvinge, et al., "Internal Representations of Vision Models Through the Lens of Frames on Data Manifolds", Proceedings of Machine Learning Research 228, 2023.
Wang, et al., "The Geometry of Deep Generative Image MOD-ELS and its Applications", Published as a conference paper at ICLR 2021.

* cited by examiner

*Primary Examiner* — Calvin C Ma
(74) *Attorney, Agent, or Firm* — Jeffrey Schox; Annabel Imbrie-Moore

(57) ABSTRACT

The method can include: recording a neural state, determining a latent array, and determining an output based on the latent array. In variants, the method can function to enable a subject to use neural signals to navigate within a high-dimensional concept space to control an output (e.g., image generation, motor control, communication, etc.).

17 Claims, 11 Drawing Sheets

SYSTEM AND METHOD FOR A BRAIN-COMPUTER INTERFACE

CROSS-REFERENCE TO RELATED APPLICATIONS

This application claims the benefit of U.S. Provisional Application No. 63/571,815 filed 29 Mar. 2024, which is incorporated in its entirety by this reference.

TECHNICAL FIELD

This invention relates generally to the brain-computer interface field, and more specifically to a new and useful system and method in the brain-computer interface field.

DETAILED DESCRIPTION

The following description of the embodiments of the invention is not intended to limit the invention to these embodiments, but rather to enable any person skilled in the art to make and use this invention.

1. Overview

Figure 1:
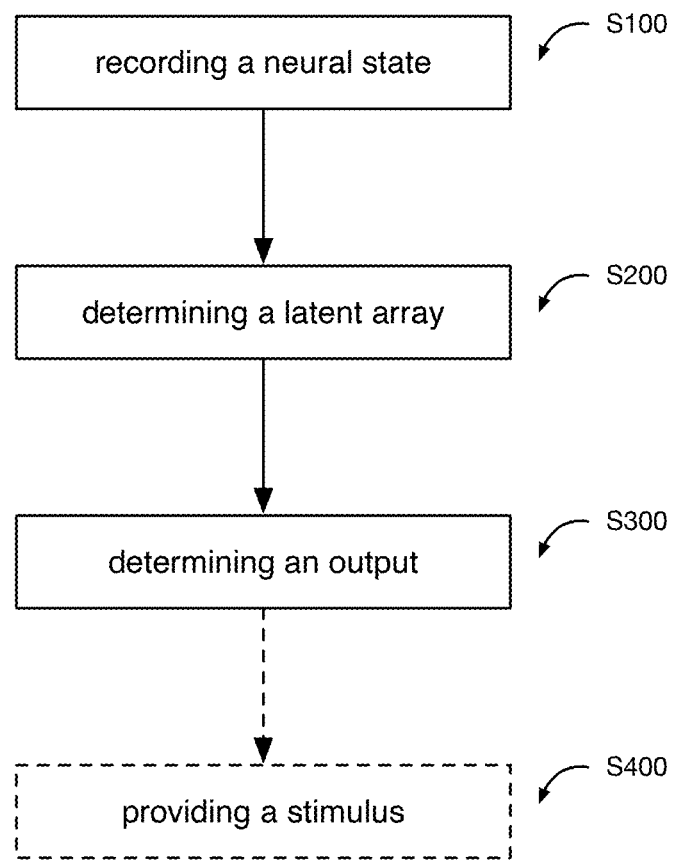
FIG. 1 is a schematic representation of a variant of the method.

As shown in FIG. 1, the method can include: recording a neural state S100, determining a latent array S200, and determining an output S300. However, the method can additionally or alternatively include any other suitable steps.

In variants, the method can function to enable a user (e.g., a subject) to use neural signals to navigate within a high-dimensional concept space to control an output (e.g., image generation, motor control, communication, etc.). In a specific example, the method can provide a new control modality for a user. In an illustrative example, the method can include translating neural signals from a subject to a semantic output (e.g., image, text, audio, etc.).

2. Examples

In an example, the method can include: using a brain-computer interface (BCI), recording an m-dimensional neural state vector from a subject (where each vector component can be a recorded measurement from a neuron in a set of neurons); transforming the m-dimensional neural state vector into an n-dimensional latent array within the latent space of a generative model; and using the generative model to determine an output (e.g., image, text, etc.) based on the n-dimensional latent array. For example, the latent space can be an intermediate latent space within the generative model, wherein the remainder of the generative model is used to determine the output (e.g., input layer(s) of the generative model are skipped). For example, the n-dimensional latent array can define a vector (e.g., including magnitude and direction) in the latent space, where the vector can be used to determine an updated position on the manifold (e.g., given a starting reference position on the manifold). The subject can learn the structure of the latent space, the structure of the manifold within the latent space, and/or learn how to traverse along the manifold to output a target (e.g., target image, target text, etc.). In a specific example, the latent space position can represent a neural cursor (e.g., an abstract, high-dimensional neural cursor), wherein the subject can learn to control the activity pattern within the set of neurons to control the neural cursor within the latent space.

The method can optionally include training a subject to control their neural signals to drive movement of the neural cursor (e.g., driving movement within the latent space). In an illustrative example, a target output (e.g., a target image that the subject is aiming to match) can be provided at a user interface and an initial (e.g., randomized) latent space position can be generated, where this initial latent space position can be used as the 'current latent space position' for the first iteration of the method. In this illustrative example, the method can include, iteratively: determining electrical signals based on the current latent space position, delivering the electrical signals to a first set of electrodes interfacing with the brain of the subject, determining a current output (e.g., an image corresponding to the current latent space position) based on the current latent space position, providing the current output at the user interface, recording electrical measurements from a second set of electrodes interfacing with the brain of the subject, determining a neural state vector based on the electrical measurements, transforming the neural state vector to a latent vector, and determining an updated latent space position based on the initial latent space position and the latent vector (e.g., where the updated latent space position is used as the 'current latent space position' in the next iteration). The subject can optionally be rewarded when the current output matches the target output within a threshold similarity metric.

3. Technical Advantages

Variants of the technology can confer one or more advantages over conventional technologies.

Classic brain-computer interface (BCI) technology has focused on the task of 2-dimensional control, typically decoded from the primary motor area (M1) of a subject. Variants of the technology can enable the subject to control an abstract neural cursor in a high-dimensional space, such as the latent space of a deep generative model (e.g., a large language model, generative image model, etc.). This can equip the subject with a novel high-dimensional actuator that bypasses the compressive bottleneck inherent to most existing biological actuators (e.g., motor control, language, etc.). In a specific example, rather than decoding a brain's native latent space, variants of the technology can leverage the brain's natural plasticity to teach the subject a novel avenue for control that preserves the high resolution of information encoded in neurons. In a specific example, this can provide an improved platform for a user to control an external system (e.g., an external device, a user interface, motor control, text generation, image generation, etc.).

However, further advantages can be provided by the system and method disclosed herein.

4. System

Figure 2:
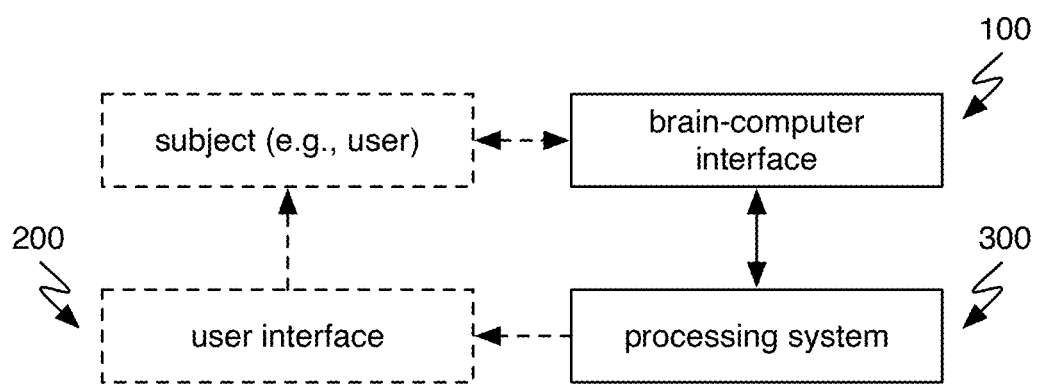
FIG. 2 is a schematic representation of a variant of the system.

As shown in FIG. 2, the system can include: a brain-computer interface (BCI) 100 and a processing system 300. The system can optionally include a user interface 200 and/or any other suitable systems.

The BCI 100 (e.g., neural interface device, neural recording device, etc.) can function to receive signals from and/or send signals to a set of neurons of a subject. The subject (e.g., user) can be a human, a primate (e.g., monkey, chimpanzee, ape, etc.), any other animal, and/or any other organism.

In an example, the BCI 100 can interface with a tissue of interest, wherein the tissue of interest can include the set of neurons and/or interface with the set of neurons. In a first specific example, the BCI 100 directly interfaces with the set of neurons (e.g., the BCI 100 can be implanted in or on the brain). In a second specific example, the BCI 100 indirectly interfaces with the set of neurons (e.g., the BCI 100 can be mounted to the scalp). The tissue of interest preferably includes the brain (e.g., brain surface, cerebrum, cortex, etc.), but can alternatively include a brain stem, eye (e.g., retina), spinal cord, ear, muscle, skin, nerve, skin, skull, scalp, and/or any other body region of the subject. The BCI 100 is preferably implanted at one or more implantation locations associated with the tissue of interest (e.g., locations in, on, and/or near the tissue of interest). In an example, the BCI 100 can be coupled to the brain of a subject. In a first specific example, the BCI 100 can be coupled to the surface of the subject's brain. In a second specific example, the BCI 100 can be implanted within the subject's brain. In another example, the BCI 100 can be coupled to (e.g., mounted to) the skin (e.g., EEG recording electrodes mounted on the head). However, the BCI 100 can otherwise interface with the tissue of interest.

The set of neurons are preferably neurons from an area of the brain that has sufficient plasticity to adapt to a control task, but can alternatively include any other neurons. In a specific example, the set of neurons can be within the cortex, (e.g., within the prefrontal cortex, within the primary motor cortex, etc.), but can alternatively be within any other portion of the brain, and/or any other neurons of the subject. In a specific example, the BCI 100 can be implanted in or on the frontal lobe of the brain (e.g., the primary motor cortex).

The BCI 100 preferably includes one or more electrodes (e.g., an array of active electrodes) that can directly or indirectly interface with the set of neurons, but can additionally or alternatively include other neural recording methods (e.g., fMRI, fNIRS, ultrasound, etc.). The BCI 100 can optionally include one or more reference electrodes. The number of electrodes in the BCI 100 can be between 1-100 million or any range or value therebetween (e.g., at least 50, at least 100, at least 500, at least 1 k, at least 10 k, at least 50 k, at least 100 k, at least 395 k, at least 1 million, etc.), but can alternatively be greater than 100 million. The number of neurons in the set of neurons can be between 1-100 million or any range or value therebetween (e.g., at least 50, at least 100, at least 500, at least 1 k, at least 10 k, at least 50 k, at least 100 k, at least 395 k, at least 1 million, etc.), but can alternatively be greater than 100 million. The mapping between the electrodes and the set of neurons is preferably approximately 1:1 (e.g., a single electrode records a single neuron), but can alternatively be less than 1:1 (e.g., a single electrode can record multiple neurons) or greater than 1:1.

Figure 3:
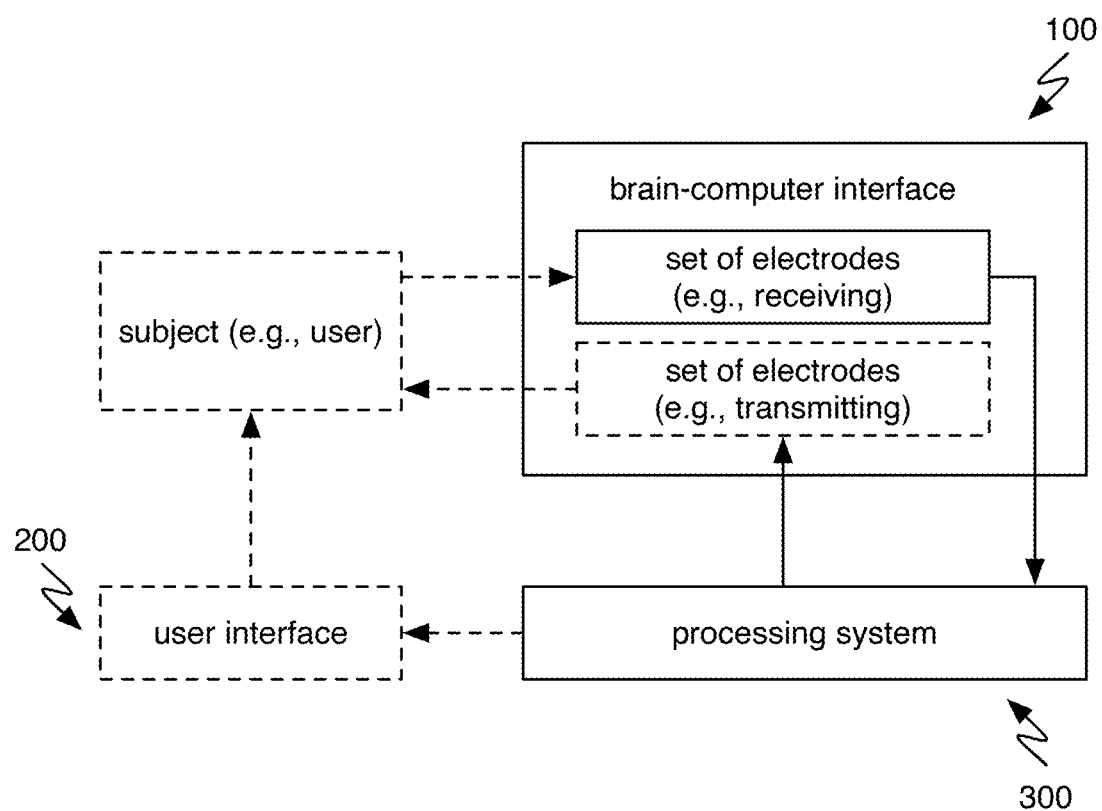
FIG. 3 is a schematic representation of an example of the system.

Electrodes can function to receive signals from and/or send (e.g., deliver) signals to the set of neurons of a subject electrical signals. The BCI 100 can optionally include one or more sets of electrodes. In a first variant, the BCI 100 can include a first set of electrodes that functions to receive electrical signals (e.g., recording electrical measurements) from a first set of neurons and a second set of electrodes that functions to deliver electrical signals to a second set of neurons (e.g., electrical signals determined based on a latent space position, electrical signals corresponding to an output, etc.). An example is shown in FIG. 3. In a first example, the first set of neurons are different from the second set of neurons (e.g., the first set of electrodes interface with different neurons than the second set of electrodes). In a specific example, the first set of neurons and the second set of neurons are non-overlapping sets of neurons (e.g., none of the neurons in the second set of neurons are in the first set of neurons and none of the neurons in the first set of neurons are in the second set of neurons). In a second example, all or a portion of the first set of neurons are also in the second set of neurons (e.g., the first set of electrodes interface with the same neurons as the second set of electrodes). In a specific example, the first set of neurons and the second set of neurons are overlapping sets of neurons. In this variant, the first set of electrodes can optionally be located at a different implantation location relative to the second set of electrodes. The number of electrodes in the first set of electrodes can optionally be different than the number of electrodes in the second set of electrodes (e.g., the first set of electrodes can include a greater number of electrodes than the second set of electrodes, or vice versa). In a second variant, the BCI 100 can include a set of electrodes where all or a portion of the electrodes in the set of electrodes can both send and receive electrical signals. In a third variant, the BCI 100 can include a set of electrodes where the electrodes in the set of electrodes receive electrical signals (e.g., the electrodes only receive electrical signals).

The user interface 200 (e.g., interface) can optionally provide (e.g., display) one or more outputs (e.g., a target output, a current output representing the subject's current state, other feedback, etc.) and/or any other parameters to the subject. In a first example, the user interface 200 can include a visual display (e.g., wherein the output is an image and/or text). In a specific example, the user interface 200 can be configured to display an output (e.g., an image) corresponding to a neural state and/or latent array (e.g., a reference latent space position). In a second example, the user interface 200 can include a speaker (e.g., wherein the output is audio). The user interface 200 can optionally receive one or more inputs (e.g., manually inputted by the subject, inputs from the BCI 100, etc.). In an example, inputs can include behavioral inputs.

The processing system 300 can include one or more: CPUs, GPUs, TPUs, custom FPGA/ASICS, microprocessors, servers, cloud computing, and/or any other suitable components. The processing system 300 can be local (e.g., local to the BCI 100 and/or to the user interface 200), remote (e.g., cloud computing server, etc.), distributed, and/or otherwise arranged relative to any other system or module. The processing system 300 can be communicatively coupled to the BCI 100 (e.g., to the first set of electrodes and the second set of electrodes in the BCI 100) and/or to the user interface 200.

The system can optionally include one or more models, including a transform model, a generative model, and/or any other model. The models can use classical or traditional approaches, machine learning approaches, and/or be otherwise configured. The models can use or include regression (e.g., linear regression, non-linear regression, logistic regression, etc.), decision tree, clustering, association rules, dimensionality reduction (e.g., PCA, t-SNE, LDA, etc.), language processing techniques (e.g., LSA), neural networks (e.g., GNN, CNN, DNN, CAN, LSTM, RNN, FNN, encoders, decoders, deep learning models, transformers, etc.), ensemble methods, optimization methods (e.g., Bayesian optimization), classification, rules, heuristics, equations (e.g., weighted equations, etc.), selection (e.g., from a library), lookups, regularization methods (e.g., ridge regression), Bayesian methods (e.g., Naive Bayes, Markov, etc.), instance-based methods (e.g., nearest neighbor), kernel methods, support vectors (e.g., SVM, SVC, etc.), statistical methods (e.g., probability), comparison methods (e.g., matching, distance metrics, thresholds, etc.), deterministics, genetic programs, foundation models (e.g., language models), and/or any other suitable model.

The models can include (e.g., be constructed using) a set of input layers, intermediate layers, output layers, and/or hidden layers (e.g., connected in series, such as in a feed forward network; connected with a feedback loop between the output and the input, such as in a recurrent neural network; etc.; wherein the layer weights and/or connections can be learned through training); a set of connected convolution layers (e.g., in a CNN); a set of self-attention layers; and/or have any other suitable architecture. The models can extract data features (e.g., feature values, feature vectors, etc.) from the input data, and determine the output based on the extracted features. However, the models can otherwise determine the output based on the input data.

Models can be trained, learned, fit, predetermined, and/or can be otherwise determined. The models can be trained or learned using: supervised learning, unsupervised learning, self-supervised learning, semi-supervised learning (e.g., positive-unlabeled learning), reinforcement learning, transfer learning, Bayesian optimization, fitting, interpolation and/or approximation (e.g., using gaussian processes), backpropagation, and/or otherwise generated. The models can be learned or trained on: labeled data (e.g., data labeled with the target label), unlabeled data, positive training sets (e.g., a set of data with true positive labels), negative training sets (e.g., a set of data with true negative labels), and/or any other suitable set of data.

However, the system can be otherwise configured.

5. Method

As shown in FIG. 1, the method can include: recording a neural state S100, determining a latent array S200, and determining an output S300. The method can optionally include providing a stimulus S400. However, the method can additionally or alternatively include any other suitable steps.

All or portions of the method can be performed in real time (e.g., responsive to a request), iteratively, concurrently, asynchronously, periodically, and/or at any other suitable time. All or portions of the method can be performed automatically, manually, semi-automatically, and/or otherwise performed. All or portions of the method can be performed by one or more components of the system, using the BCI 100, using the processing system 300, using a database (e.g., a system database, a third-party database, etc.), the user interface 200, by a user, and/or by any other suitable system.

5.1. Recording a Neural State S100.

Recording a neural state S100 functions to record measurements from a set of neurons representing (e.g., encoding) a (current) neural state of a subject. The neural state is preferably recorded using the brain-computer interface (BCI) 100, but can alternatively be recorded using any other system. For example, the neural state can be recorded using a set of electrodes of the BCI 100 (e.g., a subset of electrodes of the BCI 100). The neural state can be recorded (e.g., measured) from a set of neurons of a subject, but can additionally or alternatively be recorded from any other cells.

The neural state is preferably an m-dimensional vector (e.g., a 1×m vector with m components), but can alternatively be an array (e.g., 1×m dimensional array) and/or otherwise configured. The number of dimensions of the neural state (e.g., neural state array, neural state vector, etc.) can be determined based on the number of electrodes in the BCI 100. For example, for a BCI 100 with m active electrodes (and optionally one or more reference electrodes), the neural state can be an m-dimensional vector, wherein each vector component maps to an active electrode in the BCI 100. In a specific example, when each electrode records from a single neuron, each vector component can map to a neuron. The number of dimensions of the neural state (e.g., of the neural state vector) can optionally be between 5-10,000 (e.g., less than 100, greater than 10, 20-100, 32, etc.). The components of the neural state (e.g., the vector components) can include direct electrode measurements and/or can be determined based on electrode measurements. For example, a component of a neural state vector can be a voltage measured by an electrode in the BCI 100, optionally referenced to a reference voltage (e.g., measured by a reference electrode in the BCI 100).

The neural state is preferably determined for a single point in time (e.g., defined at a single point in time). For example, the BCI 100 can record one measurement value for each of the set of electrodes (e.g., one measurement for each of the set of neurons), wherein each component of the neural state vector is the measurement for an associated electrode. However, the neural state can additionally or alternatively be determined using measurements across multiple points in time. In a first example, the neural state can be determined based on a change in measurements over time (e.g., each neural state vector component is determined based on a change from an electrode measurement at first point in time to an electrode measurement at a second point in time). In a second example, components of the neural state can include measurements at multiple points in time. In a first specific example, the neural state is an array where each row—representing an electrode and/or the corresponding neuron(s)—includes multiple measurements over time. In a second specific example, the neural state is a vector where each component includes an electrode signal (e.g., measurements over time). However, the neural state can be otherwise configured.

The neural state can optionally be iteratively updated (e.g., S100 can be repeated) at a recording frequency. The recording frequency can optionally be greater than a threshold; the threshold can be between 1 Hz-100 kHz or any range or value therebetween. Alternatively, the threshold can be less than 1 Hz or greater than 100 kHz.

However, the neural state can be otherwise determined.

5.2. Determining a Latent Array S200.

Determining a latent array S200 functions to encode the neural state (e.g., the neural signals) into a latent space (e.g., a latent space of a generative model). S200 can be performed after one or more iterations of S100 and/or at any other time.

Figure 7:
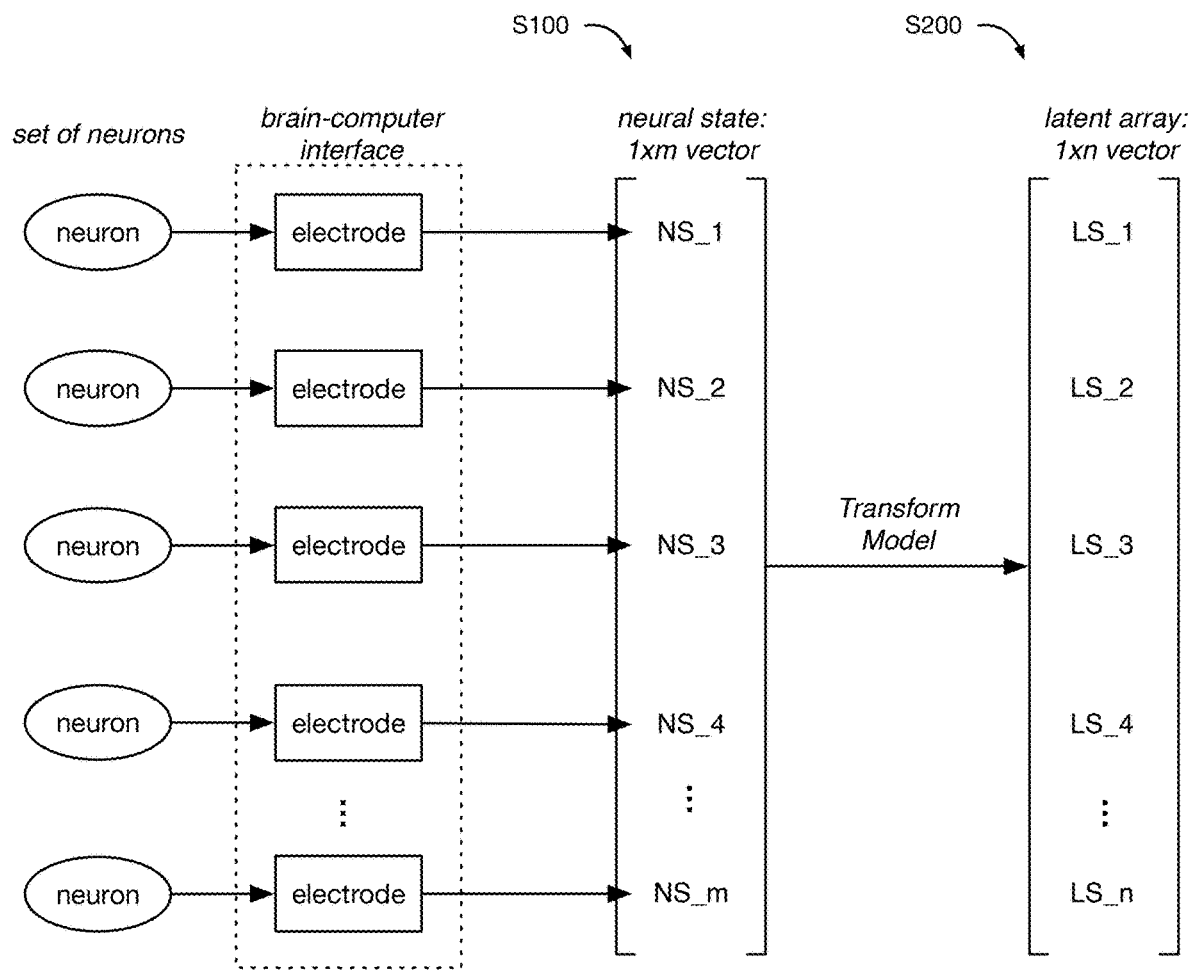
FIG. 7 depicts an illustrative example of determining a latent array.

The latent array is preferably an n-dimensional vector (e.g., 1×n vector with n components), but can alternatively be a 1×n dimensional array and/or otherwise configured. An example is shown in FIG. 7. The number of dimensions of the latent array (e.g., latent vector) can optionally be the number of dimensions of the latent space (e.g., an n-dimensional latent space). The latent array preferably includes the same or a fewer number of dimensions than the neural state (e.g., $n \leq m$), but can alternatively include a higher number of dimensions than the neural state. The number of dimensions of the latent array (e.g., the number of dimensions of the latent space) is preferably at least 3 (e.g., at least 5, at least 10, at least 50 at least 100, at least 200, at least 500, at least 1000, etc.), but can alternatively be less than 3.

The latent space can optionally define a representational space (e.g., a high dimensional concept space), wherein positions (e.g., locations, coordinates, etc.) in the latent space can map to individual outputs (e.g., text, images, motor controls, any a semantically meaningful output, etc.), as determined by the generative model. In a specific example, the latent space can be a predefined latent space of the generative model (e.g., the latent space is a layer of the pretrained generative model). The latent space can optionally include a manifold defining a subset of points within the latent space. For example, the manifold can include the subset of valid points within the latent space (e.g., points that index to valid outputs). In a specific example, the manifold can define a subset of points in the latent space corresponding to valid outputs (e.g., valid images, valid text, etc.). In a specific example, a latent space position (e.g., reference latent space position, updated latent space position, etc.) can be or define coordinates of a point on the manifold in latent space.

The latent array can define the position of and/or movement of a neural cursor (e.g., selector, indicator, controller, actuator, etc.) in the latent space. The neural cursor can be an abstract neural cursor (e.g., does not correspond to a graphical user interface cursor), but can alternatively not be abstract (e.g., does correspond to a graphical user interface cursor). In an example, the subject can actively control the neural cursor (e.g., the position of the neural cursor, the magnitude and/or direction of the velocity of the neural cursor, etc.) by controlling activation of the set of neurons.

In a first variant, the latent array (and/or the corresponding neural cursor) can specify a position (e.g., coordinates) in latent space, wherein the position indexes an output (e.g., image, text, audio, etc.) corresponding to the current neural state of the subject. In a specific example, a latent array indexes an output when that latent array—passed through a generative model—yields that output. In an illustrative example, a latent array and/or the corresponding neural cursor specifies the coordinates of an output in the latent space. In this variant, the latent array preferably specifies a point on the manifold (e.g., the neural cursor is located on the manifold), but can alternatively specify a point not on the manifold or any other point in latent space.

In a second variant, the latent array (and/or the corresponding neural cursor) can specify the velocity (e.g., including a direction and/or a magnitude) in latent space, relative to a reference latent space position (e.g., a reference location in latent space). In a first example, the reference latent space position can be a randomized position in latent space (e.g., a randomized location on the manifold). In a specific example, for the first iteration of the method, the reference latent space position can be a randomized position (e.g., randomized coordinates) in latent space. In a second example, the reference latent space position can be a previous position in latent space (e.g., the location determined in the prior iteration). In a specific example, for subsequent iterations of the method after the first iteration, the reference latent space position can be the latent space position determined in the prior iteration (e.g., corresponding to the neural state of the prior iteration). In a third example, the reference latent space position can be a current position in latent space (e.g., the location determined in the current iteration). In a specific example, for subsequent iterations of the method after the first iteration, the reference latent space position can be the latent space position determined in the current iteration (e.g., corresponding to the current neural state of the subject).

In a specific example, the latent array can specify the velocity of the neural cursor relative to a previous neural cursor position (e.g., the most recent neural cursor position; the neural cursor position for the previous iteration). In an illustrative example, the latent array and/or the corresponding neural cursor can augment an output (e.g., augmenting a previous output from a prior iteration of the method, a predetermined initial output, etc.). In an example, the latent array can specify a velocity from a reference latent space position to an updated latent space position. In a first example, the latent array specifies a velocity along the manifold (e.g., the updated latent space position remains on the manifold). In a second example, the latent array specifies a velocity moving off of the manifold (e.g., the updated latent space position is not on the manifold). In this second example, the updated latent space position can optionally be used to determine a corresponding updated position on the manifold (e.g., determining the nearest point on the manifold to the updated latent space position), wherein the updated position on the manifold can then be used as the updated latent space position in all or parts of the method.

In this second variant, the latent array can optionally include a magnitude and/or direction of movement in latent space. In a first specific example, the latent array can specify a direction in latent space, wherein an updated latent space position can be determined by moving a step (e.g., an infinitesimal step) along the specified direction from a previous latent space position. In a second specific example, the latent array can specify a magnitude and direction in latent space, wherein an updated latent space position can be determined by moving with the specified magnitude and direction from a previous latent space position. The magnitude can optionally be determined based on the subject's training level. For example, the magnitude can optionally be increased as the subject learns to control the neural cursor with higher accuracy.

The latent array can be determined based on one or more neural states. In a first variant, the latent array is determined based on a single neural state. For example, the latent array can be determined using a fixed transformation (e.g., a fixed mapping) of the neural state (e.g., neural state vector). In a second variant, the latent array can be determined based on multiple neural states. For example, the latent array can be determined based on a comparison (e.g., direction) between a first neural state and a second neural state.

Figure 4A:
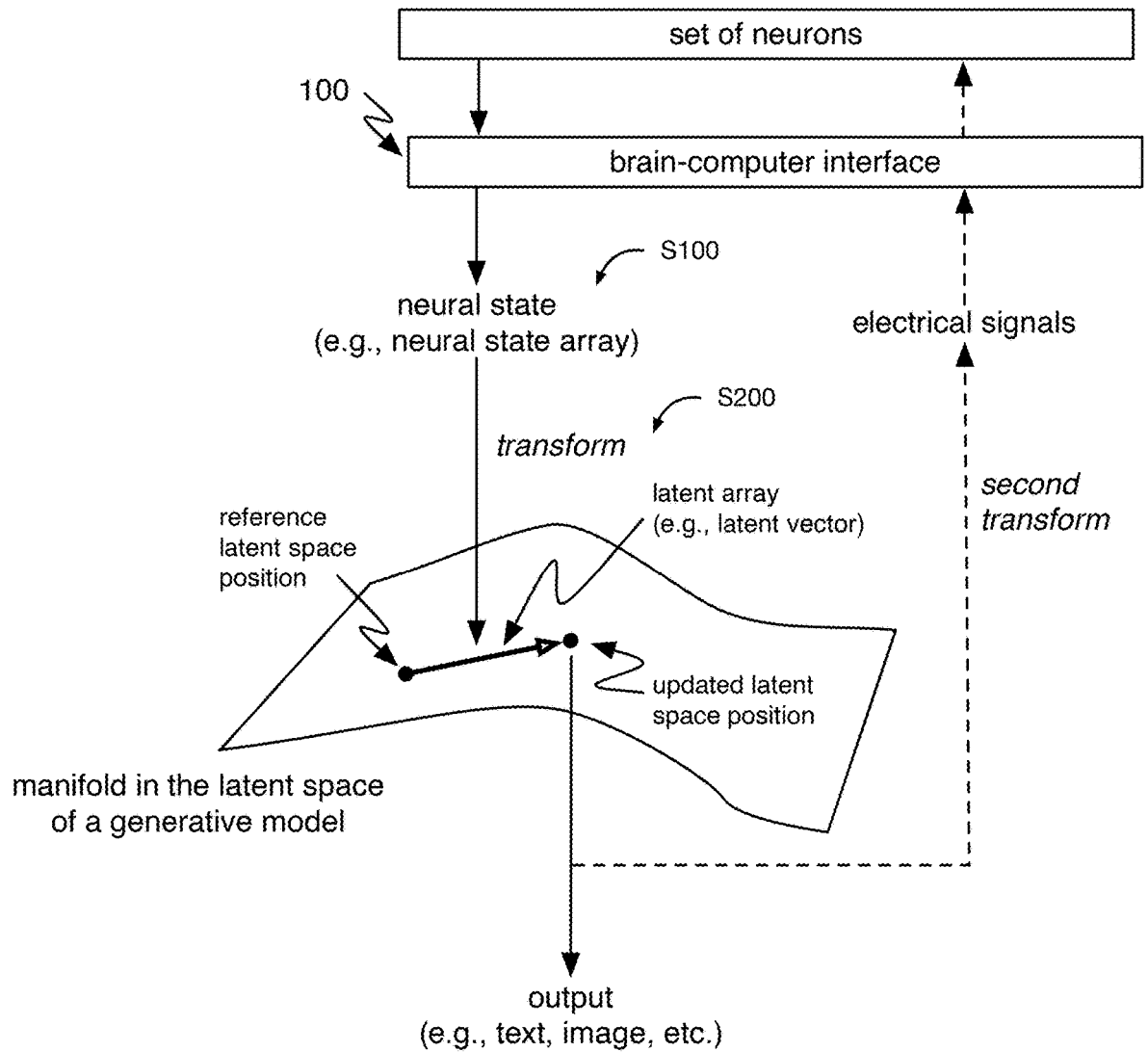
FIGS. 4A and 4B depict examples of the method, including the use of a manifold in the latent space of a generative model.
Figure 4B:
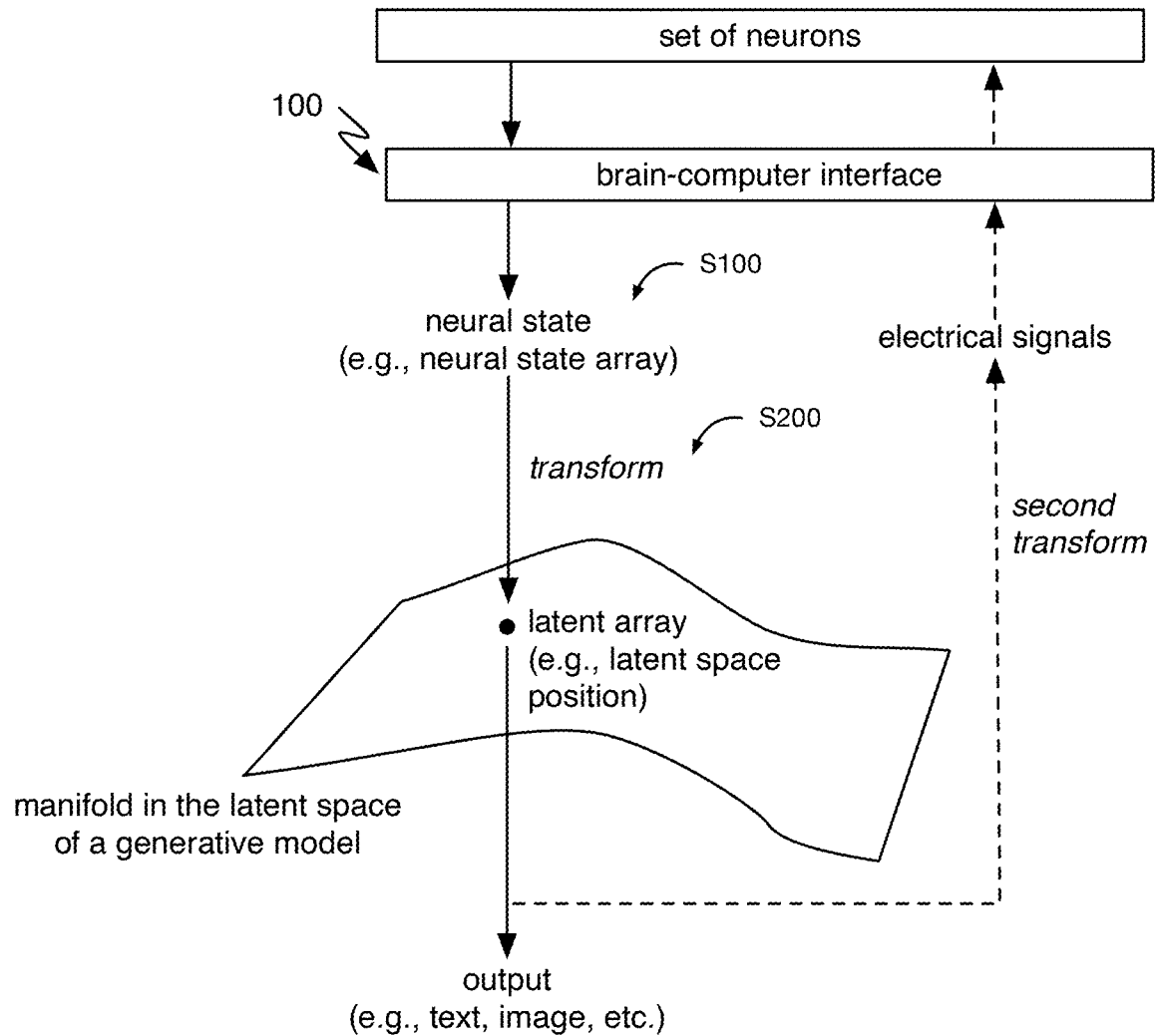

The latent array can optionally be determined using a transform model. The transform model can function to map the neural state to the latent space (e.g., onto a manifold within the latent space). Examples are shown in FIG. 4A and FIG. 4B. In a specific example, the latent array (e.g., a latent vector within a latent space of a generative model) can be determined by performing a transform on the neural state (e.g., using the transform model). Inputs to the transform model can include the neural state (e.g., neural state vector), optionally a previous neural state, and/or any other suitable inputs. Outputs from the transform model can include the latent array and/or any other suitable outputs. The transform model is preferably a deep neural network, but can alternatively be any other model. In an example, the transform model can be a vector transformation. The transform model preferably includes a non-linear transformation, but can alternatively be a linear transformation and/or any other transformation. The transform model can optionally be specific to: the latent space, generative model, BCI 100, neural state type (e.g., vector dimensions), output type (e.g., image, text, etc.), associated information thereof (e.g., the implantation location for the BCI 100), the subject, and/or any other information. However, the transform model can additionally or alternatively be generally across latent spaces, generative models, brain-computer interfaces, neural state types, output types, associated information thereof, and/or other information. In a first example, the transform model can be a fixed model (e.g., a fixed vector transformation, a pretrained model, etc.). In a second example, the transform model can update as the subject performs all or parts of the method. In a specific example, the transform model can be a learned transform that coadapts with the subject as the subject is trained to control the neural cursor.

The latent space may be dense or sparse. The latent space may be entangled or disentangled. In an example, the transform model can preserve disentanglement of the latent space (e.g., each neural state component can independently control one or more latent array components).

However, the latent array can be otherwise determined.

5.3. Determining an Output S300.

Determining an output S300 can function to decode the latent array to an output corresponding to the current neural state. S300 can be performed after one or more iterations of S200 and/or at any other time.

The output is preferably a stimulus, but can alternatively be any other output. For example, the output can be an image, a video, text (e.g., word, phrase sentence, etc.), sound (e.g., audio, music, etc.), instructions for an action (e.g., actuation instructions), a user response (e.g., mental state such as like/dislike), a combination thereof, and/or any other output.

Figure 6A:
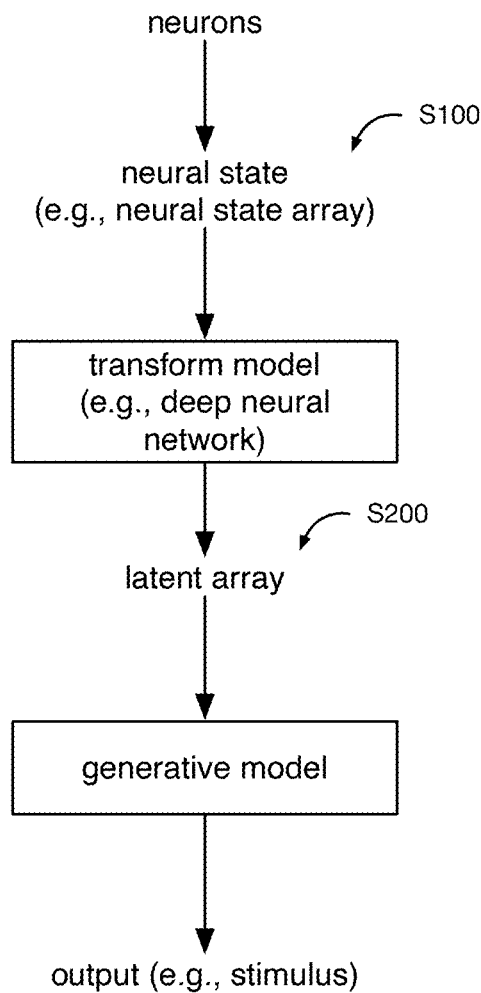
FIG. 6A depicts an example of the method, including the use of a generative model.
Figure 6B:
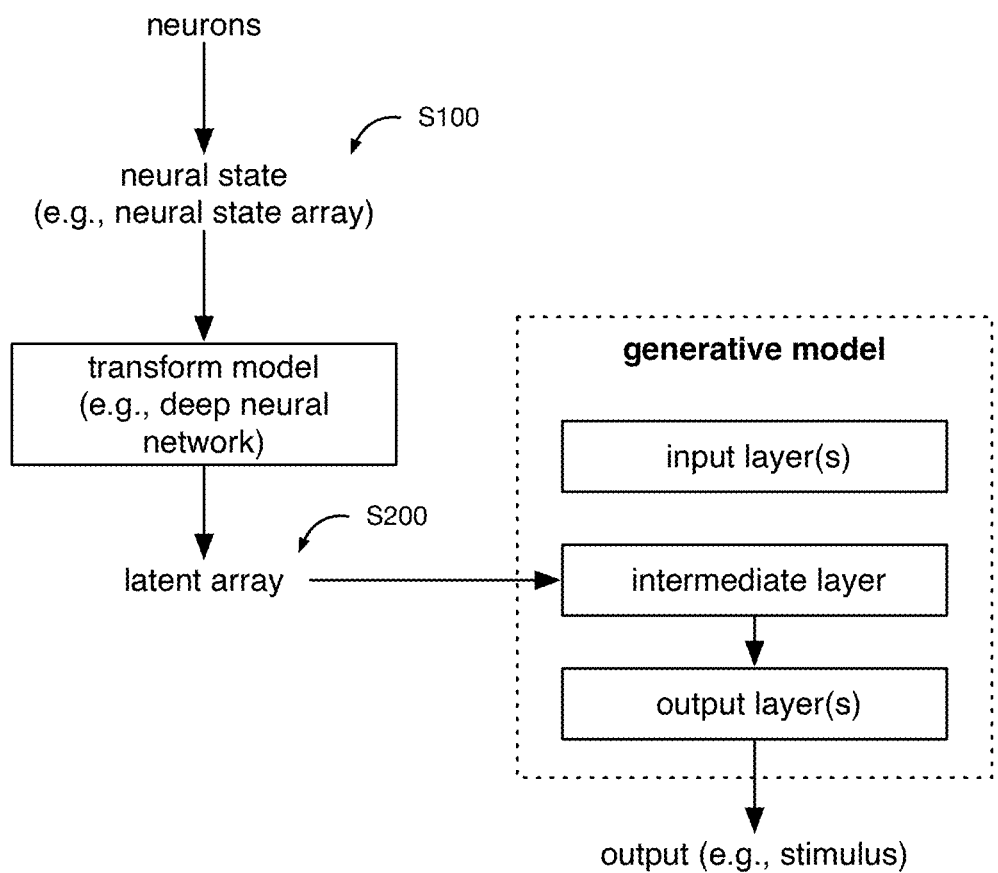
FIG. 6B depicts an example of the method, including the use of a subset of layers of a generative model.

The output can optionally be determined using all or a portion of the generative model. Examples are shown in FIG. 6A and FIG. 6B. The generative model and/or a portion thereof can function to decode the latent array to a corresponding output (e.g., stimulus). The generative model is preferably a pretrained model, but can alternatively be untrained, partially trained, trained using all or parts of the method, and/or otherwise configured. The generative model is preferably not trained using electrical measurements recorded from a brain (e.g., the generative model is a pretrained model, trained without the BCI 100). In examples, the generative model can be or include all or a portion of: a generative image model (e.g., text-to-image model), video generation model (e.g., text-to-video model), music generation model (e.g., text-to-music model), large language model (e.g., language translation model, language generation mode, etc.) and/or any other generative model. Specific examples of the generative model include: diffuser, GAN, RNN, StyleGAN (e.g., StyleGAN2), Stable Diffusion, GPT, CLIP, AnimateLCM, MusicGen, LLAMA (e.g., LLAMA 2-13B), Mixtral-8x7B, and/or any other generative model. The generative model is preferably trained (e.g., pretrained) without using electrical signals recorded from neurons (e.g., from a brain), but can alternatively be trained (e.g., tuned) using electrical signals recorded from neurons.

Inputs to the generative model can include text, images, videos, arrays (e.g., vectors), and/or any other inputs. Outputs from the generative model can include text, image, audio, and/or any other suitable output. In a specific example, the type of generative model can specify the inputs and/or outputs. In an example, the generative model can include a set of layers (e.g., a set of input layers, an intermediate layer, and a set of output layers). The generative model can optionally include a layer defining the latent space (e.g., latent space layer). The latent space layer is preferably an intermediate layer of the generative model, but can alternatively be the first layer and/or the last layer. Inputs to the latent space layer and/or at a layer following the latent space layer can include the latent array and/or any other suitable inputs.

In a specific example, inputs at the latent space layer and/or at the layer following the latent space layer can include only the latent array. For example, the latent array can be passed through the generative model via the latent space layer (e.g., input in the model directly at or after the latent space layer, bypassing an input layer and/or other precursor layers prior to the latent space layer, and optionally bypassing the latent space layer). In a specific example, the output (e.g., stimulus) can be determined using a subset of layers of the generative model (e.g., using the set of output layers, subsequent to the latent space layer). In an illustrative example, the output can be determined using all subsequent layers after the latent space layer. In a specific example, the output (e.g., stimulus) can be determined without using a subset of layers of the generative model (e.g., not using the set of input layers). In an illustrative example, the output can be determined without using: an input layer, precursor layers before the latent space layer, and/or the latent space layer.

For example, the method can include: using the BCI 100 (e.g., a set of electrodes), recording a set of electrical measurements from a brain of a subject (e.g., from a set of neurons); determining a neural state (e.g., neural state vector) based on the set of electrical measurements; performing a transform on the neural state to determine a latent array (e.g., latent vector) within a latent space of a generative model; using the generative model, determine an output based on the latent array; and optionally providing the output to the subject. In a specific example, the generative model can include a set of layers, wherein a subset of the set of layers of the generative model is used to determine the output. In a specific example, determining the output can include: determining an updated latent space position based on the latent array (e.g., latent vector) and a reference latent space position (e.g., the previous latent space position, a randomized latent space position, etc.); and using the generative model (e.g., using the subset of the set of layers of the generative model), determining the output based on the updated latent space position.

In a first illustrative example, the generative model includes a Stable Diffusion model; the latent array can be input to the generative model at or after an intermediate layer of the generative model, and the remaining layers of the Stable Diffusion model can output a generated image (the stimulus). In another illustrative example, the generative model includes a CLIP model; the latent array can be input to the generative model at or after a text embedding layer of the CLIP model (e.g., as an input to the layer following the CLIP embedding layer), and the remaining layers of the CLIP model can output a generated image (the stimulus).

However, the output can be otherwise determined.

5.4. Providing a Stimulus S400.

The method can optionally include providing a stimulus S400, which can function to: provide feedback and/or other stimulation to the subject such that the subject can learn the latent space and/or the manifold therein; perform an action based on the output from S300 (e.g., displaying the output, actuating a physical or virtual object according to the output, etc.); and/or otherwise generate a response. In a specific example, S400 can function to provide feedback in a closed-loop brain-computer interface paradigm in which the subject can learn to navigate the latent space (e.g., learning to traverse the manifold by controlling the neural cursor via the set of neurons). S400 can be performed after one or more iterations of S300 and/or at any other time.

In examples, the stimulus can be or include: the output (e.g., from S300), electrical signals (e.g., corresponding to a latent space position), a similarity score, one or more images, a video, text (e.g., word, phrase sentence, etc.), sound (e.g., music, audio, etc.), an action (e.g., moving a physical object, moving a virtual object, a graphical user interface action, etc.), feedback to the subject, a combination thereof, and/or any other stimulus. The target can be a target output (e.g., that the subject is attempting to match during training). The target can optionally be displayed and/or otherwise provided to the subject (e.g., prior to S100, concurrently with S100, etc.). In an illustrative example, the target can be a target image, wherein the subject is trying to match an output image (determined via S300) to the target image. In examples, the stimulus can be generated based on: the output (from S300), the target, a latent space position (e.g., the current latent space position), the latent array, a previous stimulus (e.g., the current image displayed to the subject), a previous output, sensor measurements, a combination thereof, and/or any other information.

In a first variant, the stimulus can be or include the output (determined via S300). For example, providing the stimulus can include providing (e.g., displaying) the output (e.g., at the user interface 200). In a specific example, a subject can learn to explore the latent space in a self-directed manner (e.g., via unstructured exploration). In an illustrative example, as the subject's neural state changes, the provided stimulus (e.g., an image) is modified and displayed to the subject.

In a second variant, the stimulus can be or include electrical signals delivered to neurons of the subject (e.g., via a set of electrodes of the BCI 100). For example, the stimulus can include electrical signals determined based on a latent space position (e.g., a reference latent space position). In a first specific example, an initial latent space position (e.g., a randomized location) can be generated for a first iteration of a training session with a subject. A corresponding set of electrical signals can then optionally be determined based on the initial latent space position and delivered to the subject via the BCI 100 (e.g., using all or a subset of the electrodes of the BCI 100). In a second specific example, an updated latent space position can be determined based on the neural state recorded from the subject (and based on a previous latent space position). A corresponding set of electrical signals can then optionally be determined based on the updated latent space position and delivered to the subject via the BCI 100 (e.g., using all or a subset of the electrodes of the BCI 100).

In this second variant, the electrical signals can be determined using a second transform model (e.g., a different transform model than the neural state to latent array transform model). The second transform model can function to map the (current) latent space position to electrical signals. Examples are shown in FIG. 4A and FIG. 4B. The second transform model can include any transform model as previously described. Inputs to the second transform model can include a latent space position (e.g., the coordinates of the latent space position) and/or any other suitable inputs. Outputs from the second transform model can include the electrical signals, a vector corresponding to electrical signals (e.g., where each component represents an electrical signal for an electrode to deliver), and/or any other suitable outputs. The second transform model is preferably a deep neural network, but can alternatively be any other model. In an example, the second transform model can be a vector transformation (e.g., a non-linear vector transformation).

Figure 8:
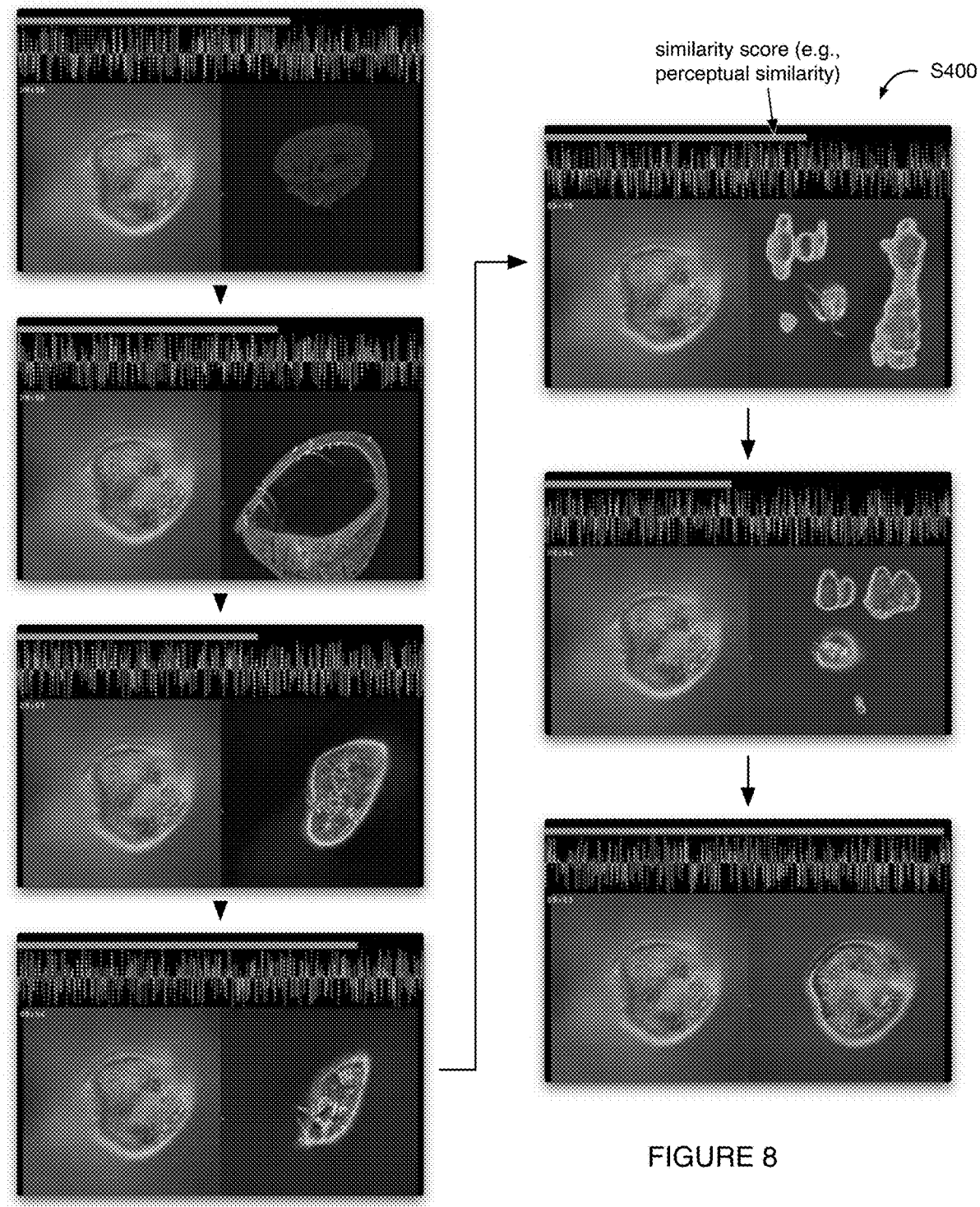
FIG. 8 depicts an illustrative example of an agent (e.g., random agent) using a neural cursor to traverse along a latent space to match a target image.
Figure 9:
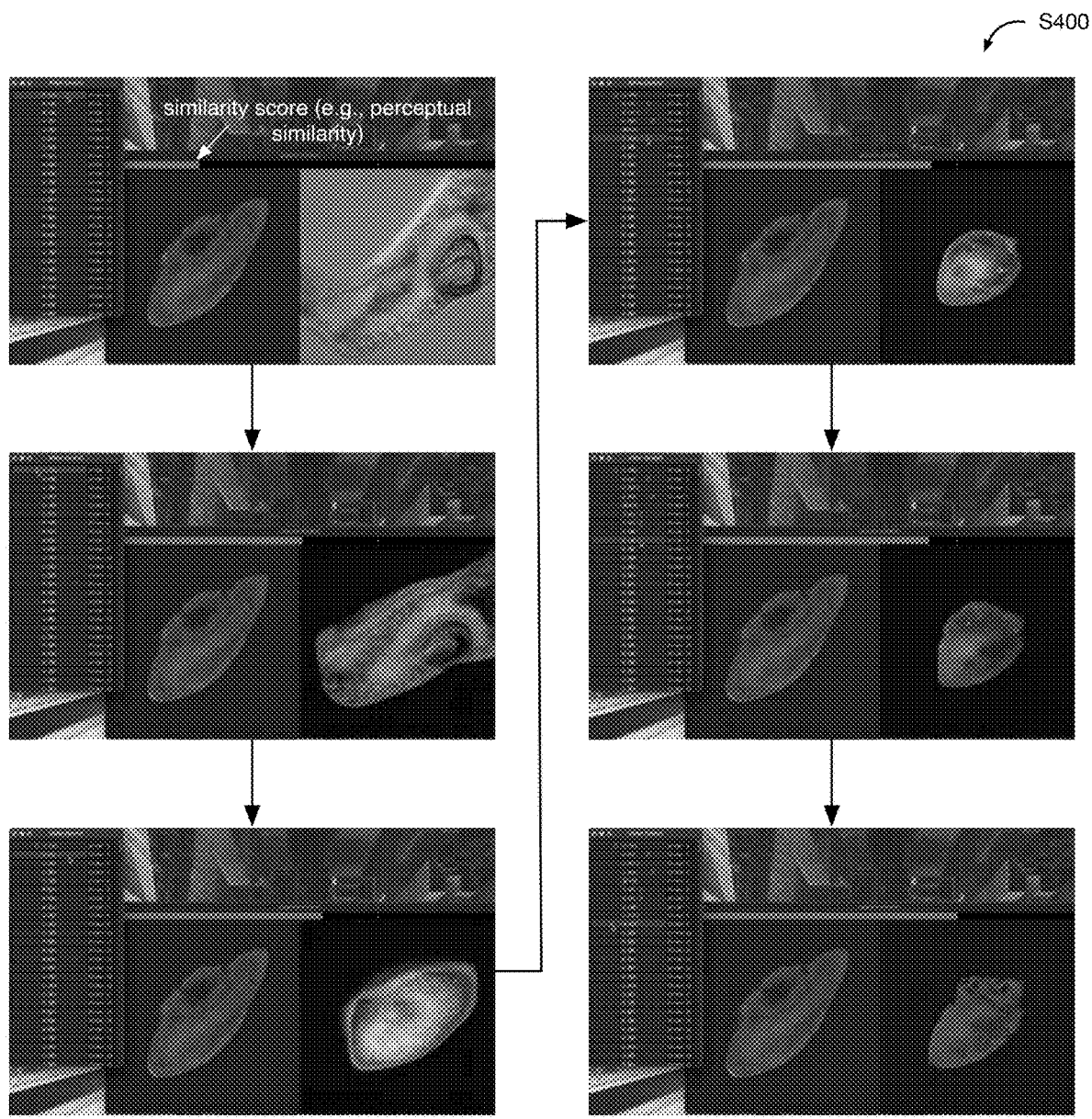
FIG. 9 depicts an illustrative example of an agent (e.g., human subject) manually traversing along a latent space to match a target image.

In a third variant, the stimulus can be or include feedback generated based on the output (determined via S300). Feedback can be positive feedback, negative feedback, a display of information (e.g., displaying the output, displaying a similarity score, etc.), and/or any other feedback. The feedback can be displayed (e.g., at the user interface 200), be provided as direct stimulation to the brain, and/or be otherwise provided to the subject. For example, the feedback can be determined based on a comparison between the output (determined via S300) and the target. For example, the feedback can include and/or be determined based on a similarity score, wherein the similarity score can represent a similarity between the output (determined in S300) and the target. In an example, the similarity score can be determined using comparison methods (e.g., matching, distance metrics, thresholds, etc.). The similarity score can be qualitative, quantitative, relative, discrete, continuous, a classification, numeric, binary, and/or be otherwise characterized. In an example, a target (e.g., target image, target text, etc.), a current output corresponding to the current neural state, and optionally the stimulus score can be displayed to a subject. In this example, the goal of a task (e.g., a generative match-to-sample task) can be for the subject to modify the current output so that it matches the target. In a specific example, when a threshold of similarity (e.g., LPIPS perceptual similarity) is reached between the current output and the target, the trial is counted as a success and the subject is rewarded. Examples are shown in FIG. 8 and FIG. 9.

In a fourth variant, the stimulus can be determined independently from the output determined in S300. For example, the stimulus can include direct stimulation to the subject's brain (e.g., via the BCI 100), wherein the stimulation (e.g., spontaneous activity) can optionally aide the subject in learning information about: the transformation from the neural state to the latent space, the latent space (e.g., the structure of the latent space), and/or the manifold. In a specific example, the stimulation pattern can be determined based on the transformation model, the latent space, and/or the manifold (e.g., the stimulation pattern can be defined by the relationship between neurons in the latent space). In an illustrative example the relationship between the stimulation and the connectivity between neurons within the latent space (e.g., between components of the neural state vector, transformed to the latent array) can be determined based on (e.g., can mimic) the relationship between retinal waves and the connectivity between cells within the retina.

In a fifth variant, the stimulus can be or include an action generated based on the output, wherein providing the stimulus can include performing the action (e.g., at the user interface 200, at another system, etc.). In a first illustrative example, the output can include action instructions for a game (e.g., a video game), wherein providing the stimulus can include performing the action instructions and updating the game. In a second illustrative example, the output can include action instructions for the user interface 200 (e.g., graphical user interface), wherein providing the stimulus can include performing the action instructions at the user interface 200. In a third illustrative example, the output can include action instructions for physical movement of an object (e.g., a robot), wherein providing the stimulus can include performing the movement (e.g., augmenting or restoring motor control for the subject).

However, providing a stimulus can be otherwise performed.

Figure 5:
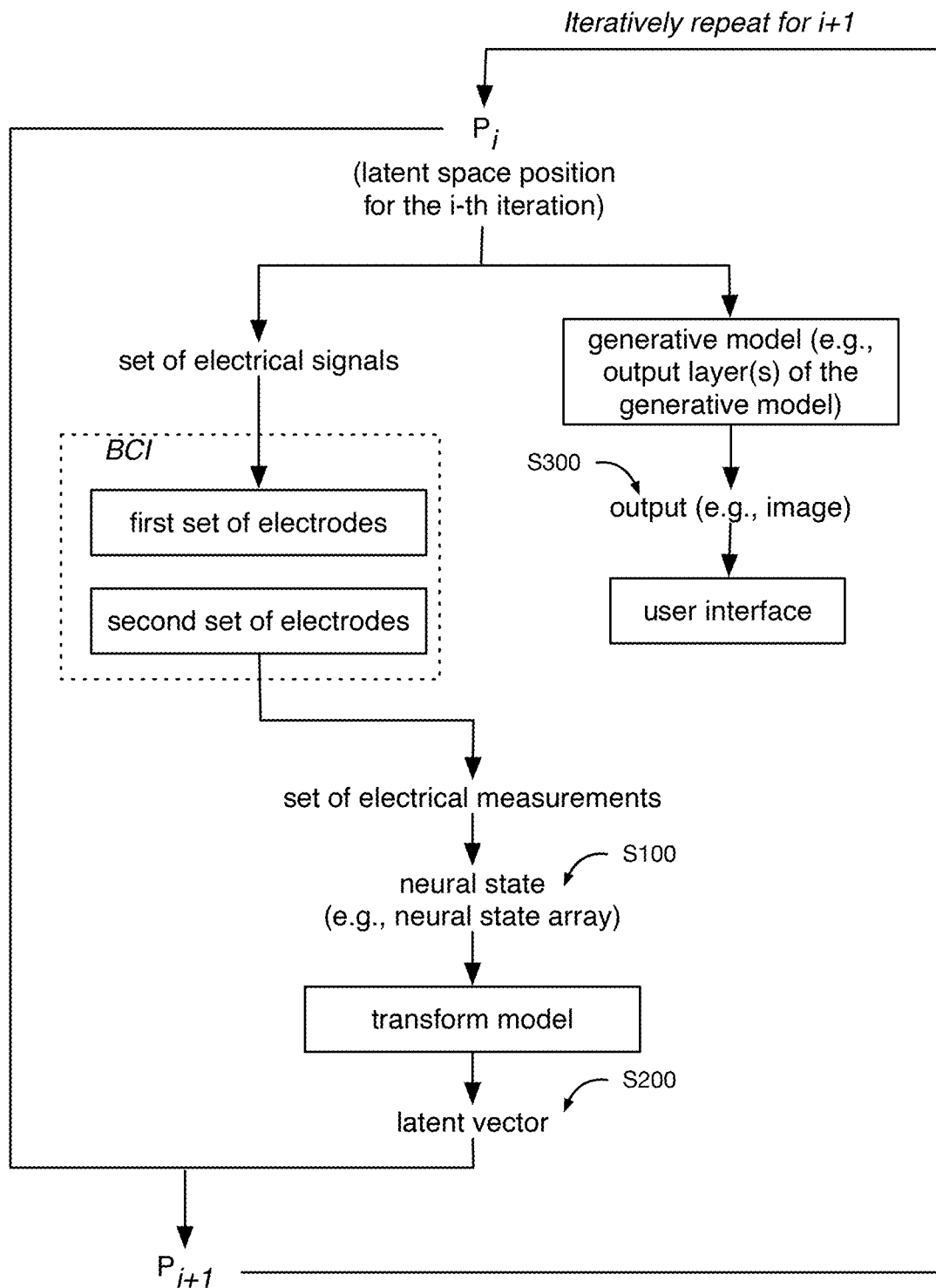
FIG. 5 depicts a specific example of the method.

All or a portion of the method can be used to train a subject to control their neural signals to control the output (e.g., to drive movement of the neural cursor within the latent space). An example is shown in FIG. 5. For example, the method can include providing a target (e.g., target image, target audio, etc.) to the subject, wherein the subject's goal during training can be to control the neural state such that the corresponding output matches the target.

In an example, the method can include: starting from an initial latent space position, iteratively updating the latent space position (e.g., via S100 and S200) and corresponding output (e.g., via S300) until a stop condition is met (e.g., until the output matches the target within a threshold similarity, until a number of iterations have occurred, etc.). The initial latent space position can be a predetermined latent space position, a randomized latent space position, and/or any other latent space position. At each iteration, the updated output (e.g., an updated image) can optionally be provided to the subject for feedback (e.g., via S400). At each iteration, electrical signals corresponding to the updated latent space position can optionally be delivered to the subject via the BCI 100 (e.g., via S400; via a subset of the electrodes of the BCI 100). In a specific example, the method can include: determining an initial set of electrical signals based on a reference latent space position (e.g., a randomized latent space position; the latent space position of the current iteration; the latent space position of the previous iteration; etc.); using the BCI 100 (e.g., using a second set of electrodes of the BCI 100), delivering the first set of electrical signals to the brain of the subject; determining an updated set of electrical signals based on an updated latent space position (e.g., wherein the updated latent space position is determined using an updated neural state, determined using recordings from a first set of electrodes of the BCI 100); and using the BCI 100 (e.g., using a second set of electrodes of the BCI 100), delivering the updated set of electrical signals to the brain of the subject.

The latent space position (updated at each iteration) is preferably fully determined based on the neural state of the subject, but can alternatively be partially or fully determined independent of the neural state of the subject. For example, the latent space position can be partially or fully determined based on the target (e.g., to aid the subject in driving the latent space position towards a position corresponding to the target). In an illustrative example, early training sessions can include partially or fully controlling the latent space position to move towards a position corresponding to the target, while later training sessions can include fully controlling the latent space position based on the neural state of the subject.

However, the method can be otherwise performed.

6. Specific Examples

A numbered list of specific examples of the technology described herein are provided below. A person of skill in the art will recognize that the scope of the technology is not limited to and/or by these specific examples.

Specific Example 1. A system, comprising: an interface configured to display an image corresponding to a reference latent space position; a first set of electrodes configured to deliver a set of electrical signals to a brain of a subject, the set of electrical signals determined based on the reference latent space position; a second set of electrodes configured to record a set of electrical measurements from the brain of the subject; and a processing system communicatively coupled to the first set of electrodes, the second set of electrodes and the interface, wherein the processing system is configured to: determine a neural state vector based on the set of electrical measurements; performing a transform on the neural state vector to determine a latent vector within a latent space of a generative model; determine an updated latent space position based on the latent vector and the reference latent space position; using the generative model, determine an updated image based on the updated latent space position; determine an updated set of electrical signals based on the updated latent space position; control the interface to display the updated image; and transmit the updated set of electrical signals to the first set of electrodes.

Specific Example 2. The system of Specific Example 1, wherein determining the updated image based on the updated latent space position comprises outputting the updated image using a subset of a set of layers of the generative model.

Specific Example 3. The system of Specific Example 2, wherein the set of layers of the generative model comprises a set of input layers, an intermediate layer, and a set of output layers, wherein the latent space corresponds to the intermediate layer, wherein the set of output layers are used to output the updated image.

Specific Example 4. The system of Specific Example 3, wherein the set of input layers of the generative model are not used to output the updated image.

Specific Example 5. The system of any of Specific Examples 1-4, wherein a number of electrodes in the second set of electrodes is different than a number of electrodes in the first set of electrodes.

Specific Example 6. The system of any of Specific Examples 1-5, wherein the latent space position defines coordinates of a point on a manifold in the latent space.

Specific Example 7. The system of Specific Example 6, wherein the latent vector defines a magnitude and a direction of movement on the manifold.

Specific Example 8. The system of any of Specific Examples 6-7, wherein the manifold defines a subset of points in the latent space corresponding to valid images.

Specific Example 9. The system of any of Specific Examples 1-8, wherein the generative model comprises a pretrained generative model.

Specific Example 10. The system of Specific Example 9, wherein the pretrained generative model is not trained using electrical measurements recorded from a brain.

Specific Example 11. A method, comprising: using a set of electrodes, recording a set of electrical measurements from a brain of a subject; determining a neural state vector based on the set of electrical measurements; performing a transform on the neural state vector to determine a latent vector within a latent space of a generative model, the generative model comprising a set of layers; using a subset of the set of layers of the generative model, determine an output based on the latent vector; and providing the output to the subject.

Specific Example 12. The method of Specific Example 11, wherein determining the output based on the latent vector comprises: determining an updated latent space position based on the latent vector and a reference latent space position; and using the subset of the set of layers of the generative model, determining the output based on the updated latent space position.

Specific Example 13. The method of Specific Example 12, wherein the updated latent space position defines coordinates of a point on a manifold in the latent space, and wherein the latent vector defines a magnitude and a direction of movement on the manifold.

Specific Example 14. The method of Specific Example 13, wherein the manifold defines a subset of points in the latent space corresponding to valid images.

Specific Example 15. The method of any of Specific Examples 12-14, further comprising: determining an initial set of electrical signals based on the reference latent space position; using a second set of electrodes, delivering the first set of electrical signals to the brain of the subject; determining an updated set of electrical signals based on the updated latent space position; and using the second set of electrodes, delivering the updated set of electrical signals to the brain of the subject.

Specific Example 16. The method of any of Specific Examples 11-15, wherein the set of layers of the generative model comprises a set of input layers, an intermediate layer, and a set of output layers, wherein the latent space corresponds to the intermediate layer, wherein the set of output layers are used to determine the output.

Specific Example 17. The method of Specific Example 16, wherein the set of input layers of the generative model are not used to output the updated image.

Specific Example 18. The method of any of Specific Examples 11-17, wherein the set of electrodes is coupled to the brain of the subject, wherein each vector component of the neural state vector comprises a recorded measurement.

Specific Example 19. The method of any of Specific Examples 11-18, wherein the transform preserves disentanglement of the latent space.

Specific Example 20. The method of any of Specific Examples 11-19, wherein
the output comprises at least one of an image or a sound.

As used herein, "substantially" or other words of approximation (e.g., "about," "approximately," etc.) can be within a predetermined error threshold or tolerance of a metric, component, or other reference (e.g., within +/−0.001%, +/−0.01%, +/−0.1%, +/−1%, +/−2%, +/−5%, +/−10%, +/−15%, +/−20%, +/−30%, any range or value therein, of a reference).

All references cited herein are incorporated by reference in their entirety, except to the extent that the incorporated material is inconsistent with the express disclosure herein, in which case the language in this disclosure controls.

Different subsystems and/or modules discussed above can be operated and controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A system, comprising:
an interface configured to display an image corresponding to a reference latent space position;
a first set of electrodes configured to deliver a set of electrical signals to a brain of a subject, the set of electrical signals determined based on the reference latent space position;
a second set of electrodes configured to record a set of electrical measurements from the brain of the subject; and
a processing system communicatively coupled to the first set of electrodes, the second set of electrodes and the interface, wherein the processing system is configured to:
determine a neural state vector based on the set of electrical measurements;
performing a transform on the neural state vector to determine a latent vector within a latent space of a generative model;
determine an updated latent space position based on the latent vector and the reference latent space position;
using the generative model, determine an updated image based on the updated latent space position, wherein determining the updated image based on the updated latent space position comprises outputting the updated image using a subset of a set of layers of the generative model, wherein the set of layers of the generative model comprises a set of input layers, an intermediate layer, and a set of output layers, wherein the latent space corresponds to the intermediate layer, wherein the set of output layers are used to output the updated image;
determine an updated set of electrical signals based on the updated latent space position;
control the interface to display the updated image; and
transmit the updated set of electrical signals to the first set of electrodes.

2. The system of claim 1, wherein the set of input layers of the generative model are not used to output the updated image.

3. The system of claim 1, wherein a number of electrodes in the second set of electrodes is different than a number of electrodes in the first set of electrodes.

4. The system of claim 1, wherein the latent space position defines coordinates of a point on a manifold in the latent space.

5. The system of claim 4, wherein the latent vector defines a magnitude and a direction of movement on the manifold.

6. The system of claim 4, wherein the manifold defines a subset of points in the latent space corresponding to valid images.

7. The system of claim 1, wherein the generative model comprises a pretrained generative model.

8. The system of claim 7, wherein the pretrained generative model is not trained using electrical measurements recorded from a brain.

9. The method of claim 1, wherein the set of input layers of the generative model are not used to determine the updated image.

10. A method, comprising:
using a set of electrodes, recording a set of electrical measurements from a brain of a subject;
determining a neural state vector based on the set of electrical measurements;
performing a transform on the neural state vector to determine a latent vector within a latent space of a generative model, the generative model comprising a set of layers, wherein the set of layers of the generative model comprises a set of input layers, an intermediate layer, and a set of output layers, wherein the latent space corresponds to the intermediate layer;
using a subset of the set of layers of the generative model, determine an output based on the latent vector, wherein the set of output layers of the generative model are used to determine the output; and
providing the output to the subject.

11. The method of claim 10, wherein determining the output based on the latent vector comprises:
determining an updated latent space position based on the latent vector and a reference latent space position; and
using the subset of the set of layers of the generative model, determining the output based on the updated latent space position.

12. The method of claim 11, wherein the updated latent space position defines coordinates of a point on a manifold in the latent space, and wherein the latent vector defines a magnitude and a direction of movement on the manifold.

13. The method of claim 12, wherein the manifold defines a subset of points in the latent space corresponding to valid images.

14. The method of claim 11, further comprising:
determining an initial set of electrical signals based on the reference latent space position;
using a second set of electrodes, delivering the first set of electrical signals to the brain of the subject;
determining an updated set of electrical signals based on the updated latent space position; and
using the second set of electrodes, delivering the updated set of electrical signals to the brain of the subject.

15. The method of claim 10, wherein the set of electrodes is coupled to the brain of the subject, wherein each vector component of the neural state vector comprises a recorded measurement.

16. The method of claim 10, wherein the transform preserves disentanglement of the latent space.

17. The method of claim 10, wherein the output comprises at least one of an image or a sound.

* * * * *